United States Patent [19]
Vasquez

[11] 4,103,449
[45] Aug. 1, 1978

[54] FLY TRAP

[76] Inventor: Joe M. Z. Vasquez, 122 N. Orange St., Azuza, Calif. 91702

[21] Appl. No.: 708,585

[22] Filed: Jul. 26, 1976

[51] Int. Cl.² ............................................. A01M 1/10
[52] U.S. Cl. ........................................ 43/111; 43/122
[58] Field of Search ................................... 43/111, 122

[56] References Cited

U.S. PATENT DOCUMENTS

| 599,501 | 2/1898 | Grenzebach | 43/111 |
| 722,143 | 3/1903 | Raymond | 43/122 |
| 1,202,542 | 10/1916 | Lewis | 43/111 |
| 1,554,124 | 9/1925 | Ongstad | 43/122 |

Primary Examiner—Jay N. Eskovitz
Assistant Examiner—Daniel J. Leach
Attorney, Agent, or Firm—Ronald L. Juniper

[57] ABSTRACT

A box-shaped device for trapping flies including a bottom opening below which a fly food tray is positioned. Means are provided to periodically agitate the food tray so as to cause flies alighting thereon to enter into the fly trap through the bottom entry thereof.

4 Claims, 5 Drawing Figures

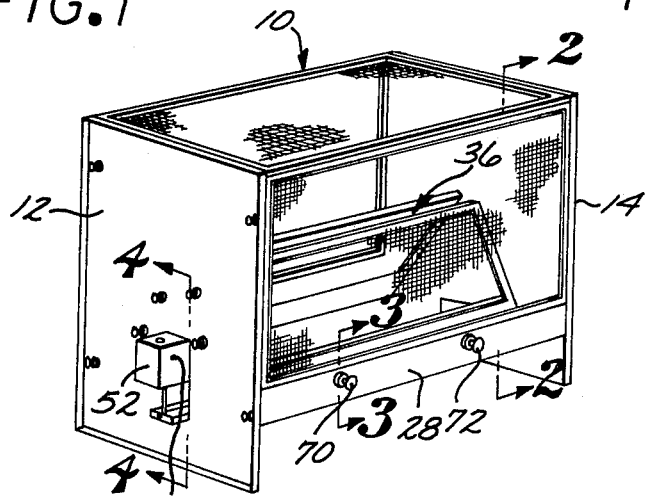
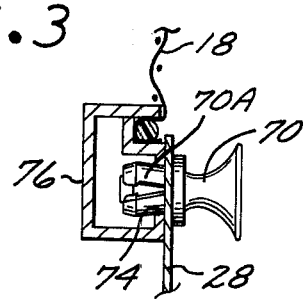
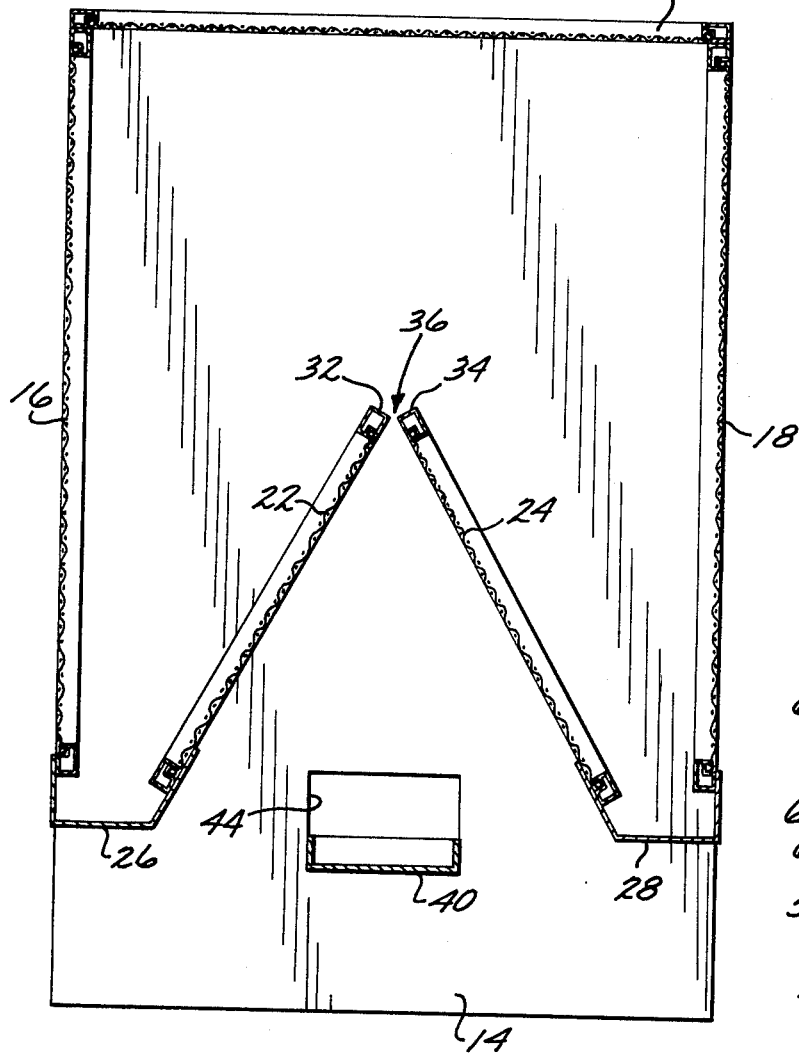
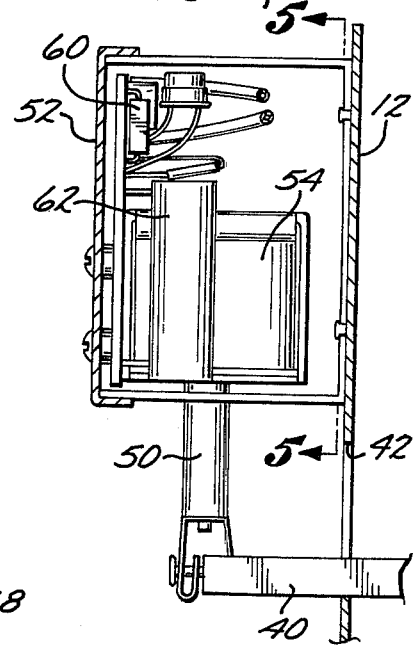
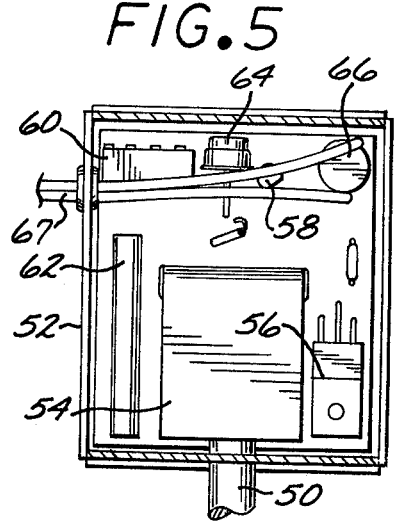

FLY TRAP

BACKGROUND OF THE INVENTION

Disposing of flies has proved a problem not satisfactorily solved before this invention, where sanitation, in particular, is important, such as in restaurants.

Simple methods, such as poisoning, are undesirable as are many common methods which leave the pollution causing debris of flies on the premises.

SUMMARY

Briefly, this invention comprises a screened box-shaped fly trap container made of quickly detachable component parts. A small entry slot just large enough to permit entry of a fly-type insect is provided by a gap between the inward terminal ends of a pair of cone screens (angled to form a cross-sectional cone) projecting upwardly and inwardly from the bottom of the trap. A fly trap food tray (which is provided with insect attracting bait) is held by the trap components in position for movement by suitable agitating means. Preferably, the agitating means is controlled by a suitable timing device that intermittently shakes the food tray in such a manner that an insect alighting thereon is startled into jumping off onto one of the cone screens. There, the insect will tend to move away from the agitated food tray, through the gap in the cone screens, and into the trap from which it is unlikely to escape because it will move to the outer walls which are closed.

BRIEF DESCRIPTION OF THE DRAWINGS

FIG. 1 is an isometric perspective view of a preferred form of this invention.

FIG. 2 is a cross-sectional view of this invention as shown in FIG. 1 taken through line 2—2 thereof.

FIG. 3 is a cross-sectional view of a latch-button connection taken through line 3—3 in FIG. 1.

FIG. 4 is a cross-sectional view of the activating mechanism taken through line 4—4 in FIG. 1.

FIG. 5 is a longitudinally sectioned view of the activating mechanism taken through line 5—5 in FIG. 4.

DETAILED DESCRIPTION OF THE DISCLOSURE

Referring to the drawings, a preferred embodiment of this invention includes a fly trap container 10 formed with end walls 12 and 14, screened side walls 16 and 18 and screened top ceiling 20. The bottom of the container 10 is provided with a pair of inwardly converging cone forming catch screens 22 and 24 which are, respectively, attached by connector plates 26 and 28 to the bottoms of the respective side walls 16 and 18. These catch screens 22 and 24 are angled inwardly partially into the container 10 toward top ceiling 20 so as to rovide a cone-like shape in cross-section as best viewed in FIG. 2. Between the inwardly converging terminal edges 32 and 34, respectively, of catch screens 22 and 24 is a small entry gap 36 taking the form of an elongated slit, just large enough for the insect to be trapped to pass through. Save for this entry gap 36, the rest of the container 10 is sealed of openings large enough from which a captured insect can escape.

A food tray 40 is positioned directly beneath this entry gap 36 and extends substantially longitudinally parallel therewith. This food tray 40 is supported for limited vertical movement by having its opposite end portions resting in vertical slots 42 and 44 cut into the respective opposite end walls 12 and 14.

In operation, suitable bait is placed in the food tray 40 thereby attracting insects into it. At predetermined intervals of time, the food tray is agitated by moving it up and down in the slots 42 and 44, within which its end portions rest. This will normally cause an insect in the food tray 40, to jump off the tray 40, up onto one of the catch screens 22 or 24 and to crawl upwardly through the entry gap 36 into the trap 10. Captured insects will ordinarily try to escape out the outside screen walls and not out the gap 36 because of its small size and central location inside the trap 10. Thus, captured insects are held until they expire from lack of food and water inside the trap 10.

A preferred form of agitation for the food tray 40, as best shown in FIGS. 4 and 5 of the drawings, is attached to one end of the food tray 40 by movable connector element 50, which takes the form of a plunger in this embodiment. An agitator container 52 is secured to the outside of end wall 12 above the end of the food tray 40 to which connector element 50 is attached.

The plunger connector element 50 is, in turn, operatively associated for vertical movement within a solenoid 54 carried in agitator container 52. To activate the solenoid 54, a power transistor 56 is electrically connected thereto and to driven transistor 58. In order to control the timing of the device, an integrated circuit using gates 60 and RC timer 62 operating at 30 to 40 second intervals has been found desirable. The output then goes through an inverter and photo-cell 64 (thus operating the device normally only in lighted conditions) to control driven transistor 58, power transistor 56 and solenoid 54 so as to pull up plunger connector element 50 with the attached food tray 40 for about 10 microseconds, after which time it is dropped, thereby agitating the tray. A full wave bridge divide assembly 66 is used to assure the proper polarity of a 12 volt battery (not shown) which energizes this circuit and is connected thereto by suitable electrical circuitry 67.

In order to facilitate cleaning, the major components of the trap 10 are joined together for quick assembly and disassembly. Thus, in the form shown, finger actuated detaching knobs 70 and 72 (for example, the New York latch type) are attached to extend through the front portion of connector plate 28. As best viewed in FIG. 3, knob 70 is provided with a normally resiliently flaring retractable knob latch 70A which expands to securely engage in an opening 74, which is smaller than when the latch 70A is flared open, but larger than when it is retracted, so as to allow entry therein in this position. The opening 74 is contained within a suitably positioned locking box 76 attached to the adjoining edge of the associated component which is here, screened side wall 18. Thus, by actuating button 70 to retract its latch 70A, the associated portion of screened side wall 18 is quickly released. In a like manner, the other components of the device are connected together, so that when the engaged portions are released, they may be quickly disengaged.

Though, a particular form of this invention has been shown and described, embodiments within the spirit of this invention are intended to be comprehended within the scope of the following claims.

I claim:

1. A trap particularly suitable for capturing flying insects including: a container formed on the outside by closed walls which are structured internally to define an insect entry; a movable food tray positioned beneath said container close enough to said insect entry thereof to cause an insect jumping from said tray to alight near said entry and pass through it into said container; agitating means operatively associated with said food tray; said container having screened top and side walls secured by end walls and upwardly angled, inwardly converging, screened bottom walls which extend from the lower inner edges of said side walls to define said insect entry by a predetermined space between their upper edges; said end walls being provided with vertical slots positioned below the entry space defined by said bottom walls; said food tray mounted in said slots in said walls in position for vertical movement therein; and said agitating means connected to said food tray so as to be able to move it at predetermined intervals.

2. A trap as defined in claim 1 wherein said trap is comprised of separate components and means are provided to quickly attach and detach said components.

3. A trap as defined in claim 1 wherein said agitating means is electrically operated to provide intermittent movement of said food tray vertically within said slots toward said insect entry so as to startle an insect on said food tray jump onto one of said bottom walls.

4. A trap as defined in claim 3 which is provided with a photoelectric cell which limits the operation of its agitating means to lighted conditions.

* * * * *